US007811339B2

(12) United States Patent
Werner

(10) Patent No.: US 7,811,339 B2
(45) Date of Patent: Oct. 12, 2010

(54) METHOD AND APPARATUS FOR FABRICATION OF FUELS FROM PRESSED BIOMASS AND USE THEREOF

(76) Inventor: Hans Werner, Kreuzkopfstrasse 1, 81825 Munich (DE)

( * ) Notice: Subject to any disclaimer, the term of this patent is extended or adjusted under 35 U.S.C. 154(b) by 636 days.

(21) Appl. No.: 10/543,232

(22) PCT Filed: Jan. 28, 2004

(86) PCT No.: PCT/EP2004/000740

§ 371 (c)(1), (2), (4) Date: Jul. 22, 2005

(87) PCT Pub. No.: WO2004/067685

PCT Pub. Date: Aug. 12, 2004

(65) Prior Publication Data

US 2006/0130396 A1    Jun. 22, 2006

(30) Foreign Application Priority Data

Jan. 28, 2003   (EP)   ................................. 03001796

(51) Int. Cl.
*C10L 5/40* (2006.01)
(52) U.S. Cl. ............................... 44/589; 44/550; 44/590
(58) Field of Classification Search .................. 44/589, 44/590, 591, 592, 593, 594, 595, 596, 597, 44/598, 599, 578–580; 34/343, 345, 397, 34/398, 399; 100/39
See application file for complete search history.

(56) References Cited

U.S. PATENT DOCUMENTS

| 4,324,561 | A |   | 4/1982 | Dean et al. |
| 4,363,636 | A |   | 12/1982 | Bouvet et al. |
| 4,529,407 | A | * | 7/1985 | Johnston et al. ............... 44/553 |
| 4,702,746 | A | * | 10/1987 | Finch ........................... 44/530 |
| 4,810,257 | A | * | 3/1989 | Lau et al. ....................... 44/490 |
| 5,352,252 | A |   | 10/1994 | Tolmie |
| 6,506,402 | B1 | * | 1/2003 | Winstrom ................... 424/442 |
| 2006/0123697 | A1 | * | 6/2006 | Jansen .......................... 44/550 |

FOREIGN PATENT DOCUMENTS

| CH | 248748 | 3/1947 |
| DE | 10153975 A1 | 5/2003 |
| EP | 0985723 A2 | 3/2000 |

OTHER PUBLICATIONS

Bossel, U. 1985. Production and marketing of briquettized and pelletized solid biomass fuels. Bioenergy 84, vol. 1: Bioenergy State of the Art. Elsevier, London, pp. 333-341.*
Forms PCT/ISA/210, 220, and 237 International Search Report for PCT/EP04/O00740, Jun. 2004.
English Abstract of Publication No. HU63310, dated Apr. 28, 1989, 1 p.

* cited by examiner

*Primary Examiner*—Robert J Hill, Jr.
*Assistant Examiner*—Brian McCaig
(74) *Attorney, Agent, or Firm*—Wood, Herron & Evans, L.L.P.

(57) ABSTRACT

Method and apparatus for fabrication of fuel from form pressed biomass wherein biomass, particularly grass, is dried prior to pressing, for example, into pellets, and use of such fuels, particularly in form of grass pellets, for energy generation.

23 Claims, 2 Drawing Sheets

Figure 1:
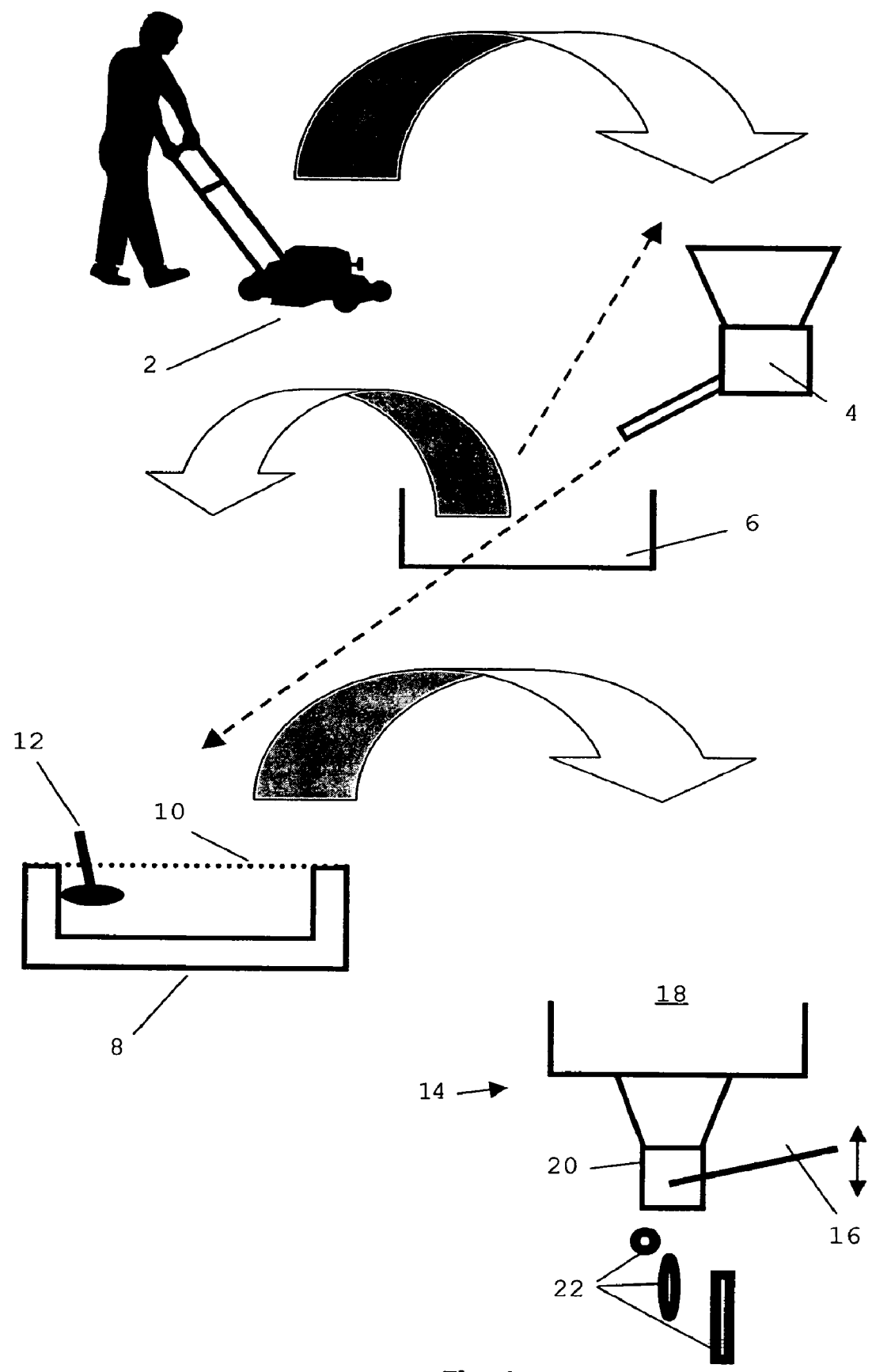

METHOD AND APPARATUS FOR FABRICATION OF FUELS FROM PRESSED BIOMASS AND USE THEREOF

FIELD OF THE INVENTION

The present invention relates to methods and apparatus for fabrication of fuels made from biomass as well as their use and, in particular, fuels made from biomass compressed to granulates, pressed articles, pellets or briquettes.

BACKGROUND OF THE INVENTION

Apart from fossil fuels, energy carriers in form of biomass are increasingly used. Biomass is considered to particularly comprise plants, components of plants, biomass and by-products of vegetable and animal origin and wood.

Conventionally, for energy production by means of biomass the same is simply burned. This procedure has several drawbacks. In dependence of the type of biomass to be burned, transportation, storage and handling for burning, particularly in private households, can be much more complex as compared with fossil fuels. As illustrative example, here it is referred to the use of straw as fuel. Further, in this procedure legal regulations, which relate to noxious emissions and efficiency in burning of biomass, can be violated if untreated biomass is used.

Due to its high energy content, wood represents a preferred biomass. In order to be able to even utilize wood in form of wood clippings, swarfs and the like, it is known to fabricate so-called wood pellets and to use the same for energy production. Comparable with coal or char briquettes, they can be easily transported, stored and handled during burning.

In view of the plurality of different types of biomass and the increasing demand for alternative energy carriers, it is desirable to provide, apart from wood, fuels from different biomasses being easy to transport, store and handled during burning.

OBJECT OF THE INVENTION

Object of the invention is to utilize, in addition to biomass in form of wood, biomass not used so far for fabrication of fuels and, then, to provide fuels, which are comparable with wood pellets as regards their transport, storage and handling during burning.

SHORT DESCRIPTION OF THE INVENTION

To solve the above-mentioned object, the present invention provides a method for fabrication of fuels from biomass, a use of such fabricated fuels, an apparatus for fabrication of such fuels and uses of the apparatus.

In the method according to the invention, it is contemplated to dry biomass by means of a technical process before fuels in pressed form is made from the dried biomass.

The terms "in pressed form", "form pressing" and comparable designations used in this connection are used in the following in order to indicate that the dried biomass is compressed, pressed, compacted and the like. In this manner fuels in pelletized, handable form can be produced. Examples for fuels made in this manner are fuels made from dried and pressed biomass in form of granulates, pressed articles, pellets, briquettes and pressed forms of larger dimension. The form of fuels according to the invention depends, for example, on the way and by means of which devices, respectively, they are to be burned. Thus, for heating in private households, using fuels according to the invention in form of pressed articles, pellets and briquettes is suggested. Using fuels according to the invention in larger installations for energy production, such as a biomass power plant for example, pressed articles of larger volume can be used. Using fuels according to the invention in form of granulates allows to burn the same in, for example, pocket heaters.

The procedure to dry biomass in advance of a fabrication of formed fuels allows using any biomass irrespective of its humidity content. So far, in known fabrication of wood pellets it was necessary to use wood having a humidity content below predefined or desired thresholds. Wood having a too high humidity content as well as other biomass was not considered particularly in form of horticultural and landscaping products and wastes. This also applies to biomass in form of cut grass, cereals and the like, which have been only used after lengthy natural drying in the open for energy production as biomass fuel wherein, as further difference to the method according to the invention, biomass used as fuel was not pressed or compacted in order to, for example, make pellets. The previous resort to biomass having large portions of fat and/or oil is not necessary any more due to the present invention. The procedure to both dry and press biomass results in fuels having, as compared with conventional approaches, increased calorific values and energy contents, respectively, per mass and/or volume.

Preferably, biomass merely obtained from horticultural and/or landscaping measures is used. It is particularly contemplated to use as biomass only such that results from horticulture and/or landscaping and that is conventionally composted. Preferably, extremely humid or wet biomass, which as such is not suitable for fuel fabrication, is used as biomass.

Preferably, only offcut from plants and/or leaves and/or foliage and/or grass and/or branches are used as biomass. Such biomass was not considered for fabrication of fuel so far. Rather, such biomass was considered as waste and, at best, used for composting. As alternative or in addition, horticultural and landscaping products, which are specifically cultivated for use as fuel, and/or waste products from animals, such as horse droppings and cowpats, and/or marine plants, such as algae, can be used as biomass.

In order to facilitate the drying process and/or in order to produce fuels in any form, it is preferred that the biomass is disintegrated before drying. This can be accomplished, for example, by chopping, shredding and the like.

Particularly for biomass having a high humidity content it is preferred to press the same before drying in order to reduce the humidity content to be removed by drying. In order to facilitate and/or improve the pressing process, it is possible to disintegrate the biomass in advance. Due to the pressing process, the biomass pre-dried therefrom can exhibit a nature, which makes the drying process as such more difficult; after this pressing, the biomass can be, for example, compressed or agglomerated. In such cases it is provided to disintegrate the biomass again after this pressing process or to treat the same in any suitable manner in order to remedy a nature due to the pressing process that is undesired as regards drying.

For drying the biomass, heated gases for example in form of hot air, heated technical gases and combinations thereof can be used. It is particularly preferred to use heat waste resulting from different procedures or devices for drying the biomass, waste heat resulting from, for example, thermal power stations or in rooms or buildings in private households or in the industrial area. Here, for example, reverse cycle heating pumps can be used in order to supply waste heat to the drying process. As set forth below, it is also possible to generate, at least partially, energy required for drying by burning fuels fabricated according to the invention. As alternative or in addition it is contemplated to use a microwave heater for drying.

The temperatures used for drying in the ambiance of the biomass and the temperatures generated when drying the biomass, respectively, depend from the type of biomass, the desired or predefined duration of drying, the desired or, for example legally, defined efficiency in drying.

The drying process can be also carried out such that substances contained in the biomass to be processed before drying are obtained and/or reduced and removed, respectively. Thus, for example offensive smells, emissions being harmful or critical as regards health, smoke development and the like can be avoided when burning fuels fabricated according to the invention.

In order to reduce emission resulting from burning fuels fabricated according to the invention, if such are actually produced, it is possible to remove emissions when drying the biomass. For example, it is contemplated to suck off gases or liquids resulting when drying the biomass, for example in form of liquid particles, and to pass the same, for example, through suitable waste gas and filter devices, respectively, and, if applicable, to dispose the same as hazardous waste. Such method steps can be also carried out when the biomass is disintegrated and/or pressed.

According to a preferred embodiment, the biomass is pressurized during drying and, for example after a predefined or desired duration of drying, exposed to ambient pressure in the still heated condition. The pressure change resulting therefrom causes that further humidity escapes from the biomass.

Due to the drying of the biomass in advance of the form pressing, it is possible that different types of biomass are used in mixed form without the need to consider the humidity content of different types. If different types of biomass in mixed form are used at least the drying process and, preferably, if applicable, the disintegration and/or the pressing also are adapted accordingly. This can however prolong the different method steps and can make the same more complex but allows using any biomass without previous separation into different types.

If biomass is provided in separated form, for example separated in grass, wood, plants and the like, the individual method steps can be carried out separated for each type of biomass. This allows to optimally adjust the individual method steps to the respective type of biomass and to fabricate fuel, which bases on a single type of biomass.

If, apart from form pressing, the individual method steps are carried out for different types of biomass, the different types of biomass can be mixed and form pressed altogether. In this manner fuels, which base on different types of biomass and include biomass of different compositions and/or different percentages, can be produced. Such a combination of different types of biomass allows to use for fabrication of fuel, in addition to biomass having a high calorific value, also biomass having a low calorific value, a biomass that otherwise would not be used as single basis for a fuel due to its low calorific value. Also, different types of biomass for fabrication of fuel can be combined such that emissions of different types of biomass compensate each other or react with each other during burning such that undesired emissions, which result from separated burning of the different types of biomass, are avoided.

A preferred biomass for fabrication of fuels according to the invention is grass, which can be also combined, for example, with biomass including wood. Thus, it is contemplated to produce, by means of the method according to the invention, grass pellets and grass-wood pellet and grass- and grass wood mixtures pressed into different forms.

Preferably, only grass is used as biomass.

In another embodiment, only foliage and/or leaves are used as biomass.

In a further embodiment, only grass and wood is used as biomass.

These types of biomass have not been considered so far as biomass that is suitable for fabrication of fuel. Inter alia, this can be explained by the relatively high humidity content of such biomass and by the fact that these types of biomass are particularly suitable for composting and, as a result, use of such biomass according to the present invention represents a fundamental turn away from the previous consideration and use.

Apart from using traditional types of energy for carrying out the method according to the invention, such as energy produced by means of fossil fuels, wind energy and solar energy, it is contemplated to use fuel produced by means of the method according to the invention at least partially for energy supply in carrying out the method. To this end, fuels fabricated according to the invention can be burned in order to at least partially provide the heat energy required for drying biomass. Further, it is possible to generate electric energy by burning fuels fabricated according to the invention and to use this energy when carrying out the method.

In the use according to the invention it is contemplated to use fuels fabricated according to one of the above described methods for generation of energy in form of heat and/or electricity by burning in a firing place, an oven, a heating arrangement and the like. The present invention particularly contemplates to use fuel according to the invention made from grass dried by means of a technical process.

The apparatus according to the invention for fabrication of fuels from pressed biomass comprises a means with which the biomass is dried before being pressed into form.

Preferably, the apparatus according to the invention comprises a means for disintegration of the biomass and/or a means for pressing the biomass before being supplied to the drying means. Here, it is contemplated that the disintegration means is arranged upstream the pressing means or vice versa or that a disintegration means is used both upstream and downstream the pressing means.

In a preferred embodiment of the apparatus according to the present invention, the drying means comprises a drying chamber for receipt of the possibly disintegrated and/or pressed biomass, which is heated by means of a heated gas and/or the means of a microwave heater such that the biomass has a desired or predefined humidity content after termination of the drying process.

In order to avoid, for example, that gases and/or fluids resulting from drying can escape, it is contemplated to close the drying means during the drying process in gas and/or fluid tight manner. In this way accumulated gases and/or fluids can be sucked off, removed and, if necessary, disposed. If gases result from drying the biomass, this embodiment of the drying means allows using resulting gas pressure for pressurizing, as set forth above, the biomass during drying.

By a means for controlling pressure acting on the biomass during drying, the drying process can be improved if, for example, the biomass being still heated is exposed to a pressure drop after a predefined period of time.

In particular, if biomass is provided and dried in separated form, the apparatus according to the invention preferably comprises a means to mix the different types of dried biomass before they are form pressed. As an alternative, it is contemplated that the apparatus according to the invention comprises a means in order to mix the biomass before drying, if applicable, even before being disintegrated and/or pressed. The latter has the advantage that types of biomass provided in separated form can be processed together.

Preferably, the apparatus according to the invention also comprises a means for fabrication of form pressed fuel from the dried biomass. Such a means can be integrally or separately provided.

In order to, for example, supply the apparatus according to the invention at least partially with energy, the apparatus can comprise a means for generation of energy by burning fuels fabricated by means of the apparatus. The energy generating means can be, for example, a means (e.g. oven) providing a thermal energy to the drying means and/or a means supplying electrical energy to the apparatus according to the invention.

In a use according to the invention, the above apparatus is used for fabrication of fuel from biomass obtained from horticulture and/or landscaping measures.

In a further use according to the invention, the above apparatus is used for fabrication of fuel made from cut products from plants and/or leaves and/or foliage and/or grass and/or branches.

According to a further use according to the invention, the above apparatus is used for fabrication of fuel only from grass or only from foliage and/or leaves or only from a gras-wood mixture.

SHORT DESCRIPTION OF THE FIGURES

Figure 2:
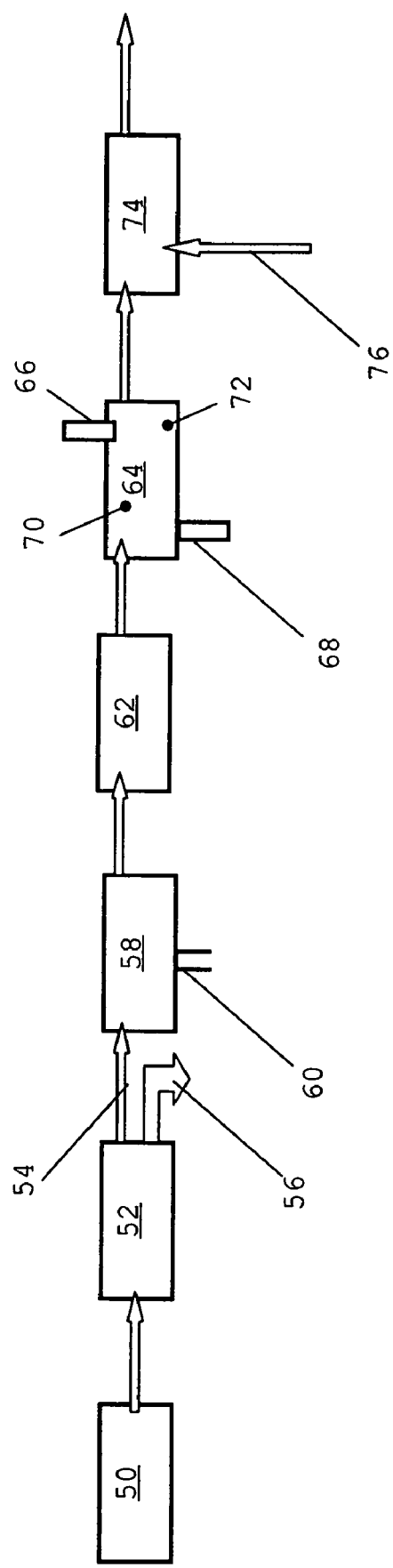

In the description of preferred embodiments of the present invention, it is referred to the accompanying figures, which show:

FIG. 1 a schematically illustration of a preferred embodiment of the method according to the invention for fabrication of fuels from pressed biomass, and FIG. 2 an schematically illustration of a preferred embodiment of the apparatus according to the invention for fabrication of fuels from pressed biomass.

DESCRIPTION OF PREFERRED EMBODIMENTS

Referring to FIG. 1 an embodiment of the method for fabrication of fuels from pressed biomass is explained with reference to the example of biomass in form of grass from which fuel in form of pellets is made. This explanation is particularly given with reference to grass waste resulting in private households that result from using a lawn mover 2.

Grass resulting from mowing lawn is usually chopped by the lawn mover 2 such that it can be dried and formed into pellets, i.e. pelletized, without further chopping. If, for example, due to the used type of lawn mover or the length of the grass to be mowed, grass results the length of which can cause problems in drying or pelletizing, a chopping device 4 is used prior drying the grass. Examples for the chopping device 4 comprise cutters, shredders and the like.

Grass chopped by means of the chopping device 4 or grass directly resulting from mowing is introduced into a drying device 8, possibly and as described below after having used a pressing device 6.

The grass is dried by means of thermal energy in the drying device 8. The drying device 8, which is designed with a double wall for isolation purposes, can comprise, for example, a microwave heating and/or heating spirals integrally formed in the double wall. However, from an energetic point of view, it is advantageous to generate thermal energy used for drying by using a not illustrated a photo voltage apparatus.

An easy way to supply thermal energy to grass accommodated in the drying device 8 is to provide the drying device 8 with a light-permeable cover 10. Comparable to a device for melting wax by means of a sun known from the field of be-keeping, sun light impinging through the cover 10 generates temperatures in the drying device 8 which are sufficient to dry the grass accommodated therein.

Steam, water particles and water resulting from drying the grass can be removed via gas and water drains not illustrated in this figure. In order to ascertain whether the grass has been dried in the drying device 8 sufficiently long, that is the grass comprises a humidity content sufficient for pelletizing, a humidity measuring device 12 provided as separate component or integrally formed with the drying device 8 can be used. In view of the application in a private household assumed here, this determination would be also carried out manually.

In order to shorten the drying and/or to reduce the expenditure of energy necessary there, it is possible to press the grass in a pressing device 6 prior to drying in order to remove humidity and water. For that purpose, for example, presses can be used which are applied in processing olives, grapes etc. Due to this pressing process, the grass can aggregate or clot which can complicate the drying process. In order to avoid this, the pressed, "pre-dried" grass can be introduced into the chopping device 4 for further chopping in order to obtain a nature supporting the drying process. This procedure is indicated in FIG. 1 by means of the dotted arrows from the pressing device 6 to the chopping device 4 and therefrom to the drying device 8.

After drying, the grass is introduced from the drying device 8 into a pelletizing device 14 which is illustrated here as one being manually actuatable by means of a lever 16. By actuating the lever 16, a predefined amount of dried grass is introduced from a storage container 18 into the actual pelletizing means 20 of the pelletizing device 14 and is formed into one or simultaneously into several pellets there. This procedure repeats until the whole dried grass from the storage container 18 is pelletized.

The such fabricated pellets 22, which can have, as illustrated in FIG. 1, different forms in dependence of the design of the pelletizing means 20, leave the pelletizing device 14 and can be burned for energy generation in order to, for example, heat by means of biomass ovens.

Referring to FIG. 2, an apparatus for fabrication of fuels from pressed biomass in form of burnable pellets of grass as well as its operation is described, which apparatus being suitable for pellets fabrication in industrial scale.

Biomass is collected in a collecting means 50, for example a container. The biomass accommodated in the collecting means 50 can be of different type and/or origin and can be in mixed form. For the sake of simplicity, in the following is assumed that one type of biomass, namely grass, is accommodated in the collecting means 50, which grass is, as described below, processed and can be mixed with a different type of biomass of a different type before pelletizing.

The grass is supplied from the collecting means 50 to a chopping means 52 which can be, for example, a shredder, chopper, etc. In order to remove impurities possibly comprised by the grass, such as stones, soil and the like it is contemplated that the chopping means 52 includes an integrally formed or downstream arranged means not indicated in this figure in order to further carry chopped grass and impurities in separated manner. This is indicated in FIG. 2 by the arrow 54 representing transportation of chopped grass and by the arrow 56 representing removal of impurities.

The chopped grass is transported from the chopping means 52 to a pressing means 58 in order to draw water from the grass by means of pressing. Water or further fluids resulting therefrom are removed via a drain 60.

In the case the grass exhibits a nature resulting from the pressing process in the pressing means 58 that complicates its drying and particularly, prolongs the duration of drying and/or requires a higher expenditure of energy in drying, the grass is supplied to a further chopping means 62 upon leaving the pressing means 58.

The such pre-dried grass is supplied from the means 60 to a drying means 64 where it is heated by means of one or several heated gases (e.g. hot air), by means of a microwave heating, by means of an electrical heating and/or the like. Vapor, particularly steam, resulting from drying and resulting water or resulting humidity can be removed via a waste gas channel 66 and a fluid drain channel 58, respectively. By means of a temperature sensor 70, the temperature of the to be dried grass and/or of the ambiance prevailing in the drying means 64 can be measured in order to, for example, avoid an undesired ignition of the grass and to control the drying process. In order to ascertain whether the grass to be dried in the drying means 64 exhibits a desired or required humidity content, a humidity measuring means 72 is used.

During drying the grass in the drying means 64, the grass can be heated at a pressure raised above ambiance pressure. If the pressure is reduced to ambient pressure near or at the end of the drying process, water, if still present, comes out of the grass due to the pressure difference between the heated grass and its ambiance.

After termination of the drying process, the dried grass is transported from the drying means 64 into a pelletizing means 74 and formed into pellets.

In order to fabricate pellets not only comprising grass, it is possible to carry out the processing of biomass up to the termination of the drying process, as described above, for a different type of biomass in separated manner. This can be sequentially accomplished by using the means 50, 52, 58, 62 and 64 or can be accomplished essentially at the same time, parallel in further means corresponding thereto. The latter case is indicated in FIG. 2 by the arrow referenced with 76 which illustrates the supply of a different dried, optionally chopped and/or pressed type of biomass. This is mixed with the grass obtained from the drying means 64 in a not illustrated means and supplied to the pelletizing means 74 in order to fabricate pellets that base on different types of biomass. In this manner, for example, it is possible to fabricate pellets comprising grass and wood.

The invention claimed is:

1. A method for the fabrication of fuels from biomass of different types and/or origin, comprising:
    mixing the biomass of different types and/or origin having high humidity content, such that undesired emissions from burning the fuels are avoided;
    subjecting the biomass mixture to a first chopping process;
    subjecting the chopped biomass mixture to a pressing process for reducing its water content downstream of the first chopping process;
    drying the chopped biomass mixture using heat downstream of the pressing process; and
    form pressing the dried and chopped biomass mixture.

2. The method according to claim 1 wherein the biomass contains impurities, the method further comprising:
    separating the impurities from the biomass upstream of the first chopping process.

3. The method according to claim 1 wherein the pressure is controlled during the drying step, and the pressure is reduced after a predefined period of time.

4. The method according to claim 1 wherein the biomass is subjected to a second chopping process downstream of the pressing process.

5. The method according to claim 1 wherein granulates, pressed articles, pellets, or briquettes are fabricated by the form pressing of the biomass.

6. The method according to claim 1 wherein the biomass is foliage and leaves, grass and wood, cut products from plants, or a combination thereof.

7. The method according to claim 1 wherein energy necessary for carrying out the method is at least partially generated by burning fuel fabricated according to the method.

8. A fuel product made according to the method of claim 1 wherein the chopped, dried, and form-pressed biomass mixture is entirely of biomass.

9. A method for the fabrication of fuels from biomass of different types and/or origin, comprising:
    subjecting a plurality of different biomasses individually to a first chopping process;
    subjecting the different chopped biomasses to a pressing process for reducing their water content downstream of the first chopping process;
    drying the different chopped biomasses using heat downstream of the pressing process;
    mixing the different chopped and dried biomasses downstream of the drying process such that undesired emissions from burning the fuels are avoided; and
    form pressing the biomass mixture.

10. The method according to claim 9 wherein at least one of the different biomasses contains impurities, the method further comprising:
    separating the impurities from at least one of the different biomasses upstream of the first chopping process.

11. The method according to claim 9 wherein the pressure is controlled during the drying step, and the pressure is reduced after a predefined period of time.

12. The method according to claim 9 wherein the different biomasses are subjected to a second chopping process downstream of the pressing process.

13. The method according to claim 9 wherein granulates, pressed articles, pellets, or briquettes are fabricated by the form pressing of the biomass mixture.

14. The method according to claim 9 wherein the different biomasses are foliage and leaves, grass and wood, cut products from plants, or a combination thereof.

15. The method according to claim 9 wherein energy necessary for carrying out the method is at least partially generated by burning fuel fabricated according to the method.

16. A fuel product made according to the method of claim 9 wherein the formed-pressed biomass mixture is entirely of biomass.

17. A method for the fabrication of fuels from biomass, comprising:
    separating impurities from the biomass;
    subjecting the biomass to a first chopping process upstream or downstream of the separation of impurities;
    subjecting the biomass to a pressing process for reducing the water content downstream of the first chopping process;

drying the biomass using heat downstream of the pressing process; and form pressing the biomass downstream of the drying.

18. The method according to claim 17 wherein the pressure is controlled during the drying step, and the pressure is reduced after a predefined period of time.

19. The method according to claim 17 wherein the biomass is subjected to a second chopping process downstream of the pressing process.

20. The method according to claim 17 wherein granulates, pressed articles, pellets, or briquettes are fabricated by the form pressing of the biomass.

21. The method according to claim 17 wherein the biomass is foliage and leaves, grass and wood, cut products from plants, or a combination thereof.

22. The method according to claim 17 wherein energy necessary for carrying out the method is at least partially generated by burning fuel fabricated according to the method.

23. A fuel product made according to the method of claim 17 wherein the dried and form-pressed biomass is entirely of biomass.

* * * * *